United States Patent [19]

Albizzati et al.

[11] Patent Number: 4,695,558

[45] Date of Patent: [*] Sep. 22, 1987

[54] CATALYSTS FOR HOMO- AND COPOLYMERIZATION OF ETHYLENE AND THE POLYMERS OBTAINED BY USE THEREOF

[75] Inventors: Enrico Albizzati, Arona; Enrico Pettenati, Milan; Umberto Zucchini; Illaro Cuffiani, both of Ferrara, all of Italy

[73] Assignee: Montedison S.p.A., Milan, Italy

[ * ] Notice: The portion of the term of this patent subsequent to Sep. 18, 2001 has been disclaimed.

[21] Appl. No.: 713,557

[22] Filed: Mar. 19, 1985

[30] Foreign Application Priority Data

Mar. 20, 1984 [IT]  Italy ................................ 20139 A/84

[51] Int. Cl.⁴ ................................................. C08F 4/64
[52] U.S. Cl. .................................... 502/123; 502/105; 502/111; 526/125
[58] Field of Search ........................ 502/123, 105, 111

[56] References Cited

U.S. PATENT DOCUMENTS

| | | | |
|---|---|---|---|
| 3,135,809 | 6/1964 | Bosmajian | 502/103 X |
| 4,472,524 | 9/1984 | Albizzati et al. | 502/123 X |
| 4,473,660 | 9/1984 | Albizzati et al. | 502/123 X |
| 4,522,930 | 6/1985 | Albizzati et al. | 502/123 X |

*Primary Examiner*—Patrick P. Garvin
*Attorney, Agent, or Firm*—Stevens, Davis, Miller & Mosher

[57] ABSTRACT

Disclosed are catalysts for the polymerization of ethylene and of mixtures thereof with olefins, comprising the product obtained by reacting the following components:

(a) an Al-alkyl compound;
(b) an electron-donor compound containing at least a nitrogen atom, said compound being reactive towards $MgCl_2$, but not towards Al-triethyl; and
(c) the reaction product between a titanium compound containing at least a titanium-halogen bond and an anhydrous magnesium halide.

The obtained (co)polymers have a very narrow molecular weight distribution which renders them particularly suitable for some applications, such as injection molding.

13 Claims, No Drawings

CATALYSTS FOR HOMO- AND COPOLYMERIZATION OF ETHYLENE AND THE POLYMERS OBTAINED BY USE THEREOF

BACKGROUND OF THE INVENTION

It is known to polymerize ethylene with very highly active catalysts prepared from organometallic compounds of elements of the I, II and III groups of the Mendelyeev periodic system, and preferably of aluminum, and from the product obtained by supporting a titanium compound on a magnesium halide in active form. Examples of such catalytic systems are reported in GB Pat. No. 1,292,853; U.S. Pat. Nos. 4,089,808 and 4,298,718.

The supported catalytic systems of the above indicated type give, in some cases, ethylene polymers with relatively narrow molecular weight distribution (MWD).

For some applications, however, and in particular for preparing formed articles by injection molding, the molecular weight distribution should be particularly narrow.

A very narrow MWD is also an important requisite of the copolymers of ethylene with alpha-olefins having middle and low density, obtained by low pressure processes (Linear Low Density Polyethylene, LLDPE), in particular as far as the mechanical and optical properties of films are concerned.

Furthermore, in the technology for LLDPE, it is important also that the catalysts, besides allowing to obtain a rather narrow MWD, be capable of providing polymers with a density generally lower than 0.930 containing relatively small percentages of polymerized alpha-olefins. Furthermore, the copolymers should not contain a significant amount of polymer extractable by means of aliphatic solvents.

THE PRESENT INVENTION

We have now found catalysts by means of which these and still other objects can be unexpectedly accomplished.

The catalyst systems of the invention comprise the product of the reaction among the following components:

(a) an Al-alkyl compound;
(b) an electron-donor compound containing at least a nitrogen atom, said compound being reactive towards $MgCl_2$, but not towards Al-triethyl under standard conditions in which the reactivity is referred to the measurement methods hereinafter described;
(c) the product of the reaction between at least a titanium compound containing at least a titanium-halogen bond and an anhydrous magnesium halide and in particular the solid comprising the titanium compound supported on an anhydrous magnesium halide the crystallites of which have an average size below 300 Å.

Examples of nitrogenous compounds particularly suitable as component (b) are: 2,2,6,6-tetramethylpiperidine, N-methyl-2,2,6,6-tetramethylpiperidine, tetramethyldiaminomethane, tetramethylethylendiamine, 2,2,-dimethyldihydroquinoline, 2,2,6,6-tetramethylpiperidide-Al-diethyl.

The quantities of components (b) which can be used are comprised between 0.01 and 10 moles per mole of Al-alkyl compound, preferably between 0.05 and 1.

The order of addition of component (b) is not critical. It can be prereacted with the Al-alkyl compound and the mixture or thus obtained reaction product can be caused to react with the solid component comprising the titanium compound and the magnesium compound, or it can be prereacted with the solid component, or, also, the three components can be fed separately into the polymerization reactor.

In the case of 2,2,6,6-tetramethylpiperidine, pre-reaction with Al-trialkyl compound forms Al-dialkyl-2,2,6,6-tetramethylpiperidide.

Component (c) is represented preferably by the product obtained by supporting a tri- or tetravalent titanium halide or halogen-alcoholate, such as, for example $TiCl_4$, $TiCl_3$, $3TiCl_3.AlCl_3$, $TiCl_3OR$ (R being a hydrocarbon radical) on an anhydrous magnesium halide the crystallites of which have an average size below 300 Å and ranging in particular from 150 to 60 Å.

The average size of the crystallites is determined by measuring the widening at half height of the reflection (110) that appears in the X-ray spectrum of the magnesium halide.

The calculus of the average size is made by applying the Sherrer equation:

$$D(110) = \frac{K\ 1.542 \times 57.3}{(B - b) \cos \theta}$$

where

K = constant (equal to 0.915 in the case of magnesium chloride, and equal to 1 in the case of other magnesium halides);
B = amplitude (in degrees) at half height of the reflection (110);
b = instrumental widening; $\theta$ = Bragg angle.

In the case of magnesium chloride, the reflection (110) appears at an angle 2 $\theta$ of 50.2°.

The X-rays spectrum is obtained by means of an apparatus equipped with an X-rays generator fitted with a Cu anode tube, by using a Cu K $\alpha$ radiation, a scintillating goniometer, a 36 KV voltage, an 18 m A current, a Ni filter.

Catalytic components as defined at point (c) and methods of preparing the same are described as examples in the following: GB Pat. Nos. 1,292,853, 1,305,610, U.S. Pat. Nos. 3,642,746, 3,953,414, 4,089,808, 4,124,532, 4,218,339, 4,220,554, 4,250,104, 4,298,718, EP Nos. 43,220 and 83,074. The relevant disclosures of these patents is incorporated herein by reference and as integral parts of this application and the herein described preparation methods.

In particular, component (c) is prepared by co-grinding mixtures of the titanium compound with magnesium halide in such proportions that the titanium content in the mixture ranges from 0.1 to 10% by weight.

The co-grinding is carried out under conditions which result in reduction of the average size of the crystallites to the values given hereinabove.

Another method consists in reacting with $TiCl_4$ adducts of magnesium halide with electron-donors, in particular adducts of formula $MgCl_2.nROH$ (wherein $1 \leq n \leq 6$ and R is an alkyl radical having from 2 to 8 carbon atoms) under conditions leading to decomposition of the adduct with formation of magnesium dihalide on which the titanium compound is supported. Generally, an excess of TiCl$_4$ is used at temperatures ranging between 60 and 135° C. Finally, the solid product obtained is separated from the excess TiCl$_4$.

Component (c) may be prepared, also, according to one of the methods described in U.S. Pat. Nos. 4,089,808 and 4,124,532.

Component (c) may also consist of an emulsion or of a dispersion in an inert liquid medium or in an inert gaseous phase of a liquid phase comprising a titanium compound (containing at least a titanium-halogen bond) immiscible in the usual aliphatic hydrocarbons. Alternatively, it can be obtained from emulsions or dispersions in an inert liquid medium (or in an inert gaseous phase of a liquid phase) of a precursor that in the liquid phase is immiscible in the usual aliphatic hydrocarbons. Lastly, it can be the solid which can be obtained from these emulsions (dispersions).

In particular component (c) can be prepared by reacting TiCl$_4$ with an emulsion or a dispersion obtained by reaction of an anhydrous magnesium dihalide, in particular MgCl$_2$, with an anhydrous aluminum halide, in particular AlCl$_3$, in an aromatic hydrocarbon, in particular toluene, in the presence of a halogenated hydrocarbon, preferably 1,2-dichloroethane.

The emulsions or dispersions that can be used as component (c) or for preparing component (c) are fully described in EP patent application 83,074.

The useful Al-alkyl compounds include the Al-trialkyls such as, for instance, AlEt$_3$, Al(i-Bu)$_3$, Al(i-C$_3$H$_7$)$_3$, Al(n-octyl)$_3$ and compounds containing two or more Al atoms bound to each other through atoms of O, N or SO$_4$ or SO$_3$ groups such as, for instance (C$_2$H$_5$)$_2$Al-O-Al(C$_2$H$_5$)$_2$;

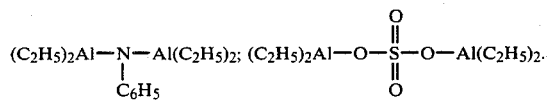

In the catalysts the Al/Ti ratio is generally comprised between 1 and 1,000.

The polymerization of ethylene and of mixtures thereof with minor proportions of alpha-olefins is carried out according to known methods: operating in a liquid phase in the presence or in the absence of an inert hydrocarbon solvent or in a gas phase.

Generally the polymerization temperature ranges from 40° to 160° C. at atmospheric pressure or at higher pressures.

Hydrogen or other known regulators are used as molecular weight regulators.

The alpha-olefins which can polymerize with ethylene include butene-1, hexene-1, 4-methylpentene, octene-1.

The amount of alpha-olefin present in polymerized form in the copolymer is generally comprised between 0.5 and 10% by moles. We have noticed that the copolymers obtained with the catalysts of the invention where 2,2,6,6-tetramethylpiperidine is prereacted with Al-trialkyl compound contain, for a given density, percentages of copoylermized alpha-olefin that are at least 20% lower than those of the copolymers prepared according to the catalyst systems known heretofore.

The density values, herein considered, are referred to polymers with MIE equal to 1 g/10'. When MIE values different from 1 g/10' are concerned, the correction is carried out according to the diagram (FIG. 3) reported in U.S. Pat. No. 3,645,992. In particular, we have found that the polymers have density values lower than those laying on the straight line passing, on the density/alpha-olefin molar content diagram, through the points having, respectively, density 0.930 g/cc and an alpha-olefin content of 1.1 and density 0.915 and an alphaolefin content of 3.7. For instance, the copolymers of the invention for a butene-1 molar content of 1.35, 2.25, 3.35 have density values, respectively, of 0.927, 0.922 and 0.916. The films obtained from these polymers present, with respect to the known polymers, a better balance of the optical and mechanical properties due to the better distribution of the alpha-olefin and to the narrower MWD.

It is known that in the field of LLDPE, MWD is a controlling factor which governs the properties of films thereof and in particular the balance of MD and TD properties (MD - medium direction; TD = transverse direction).

As practical measurement of the amplitude of the molar weight distribution the ratios between the degrees (melt index) MIN/MIE and MIF/MIE were used, where MIN, MIF and MIE are the melt indexes of the polymer measured at 190° C. respectively with a weight of 10.00, of 21.6 and of 2.16 kg (method ASTM D 1238): for polymers having comparable values of melt index MIE, the lower the values of MIF/MIE ratio the narrower the molecular weight distribution. MIF/MIE values lower than 30 and ranging in particular from 18 to 25, associated to relatively low percentages of copolymerized alpha-olefin for a given density, are particularly interesting in the case of LLDPE.

The test for the determination of compound (b) reactivity is carried out by using a potentiograph Metrohm model E 536, equipped with a titration bench E 535, an automatic burette E 552, a magnetic stirrer E 549 and titration cell EA 880.

A combined EA 281 electrode (Pt/Ag/AgCl/KCl 3M) is used.

Use is made as titrant of a 0.5M solution of Al-triethyl in hexane, which is added to a 0.5M solution of Al-triethyl in hexane, which is added to a 0.5M solution of the product under examination in benzene. One works at room temperature in a nitrogen atmosphere.

Compound (b) does not show, at the equivalence point of the titration, any appreciable potential change or drop. The drop is, on the contrary, sharp in the titration with amines such as isoquinoline and appreciable in the case of esters such as methyl paratoluate.

The reactivity test of the electron-donor compound with MgCl$_2$ is carried out under the following conditions: 2 g of MgCl$_2$ (21 mMoles) suspended in 200 cc of toluene and 3.5 mMoles of the electron-donor under examination are introduced into a 500 cc flask, in a nitrogen atmosphere. The mixture is let react at 25° C. for 1 hour, then the solid is filtered and washed with 200 cc of toluene and successively with 200 cc of n-heptane.

The solid is separated, dried and analyzed.

As MgCl$_2$ use is made of the product obtained by reacting, MgCl$_2$2.5C$_2$H$_5$-OH with Al-triethyl according to the following modalities: 2,340 cc of a 0.83M solution of Al(C$_2$H$_5$)$_3$ in hexane are introduced into a 3,000 ml flask; keeping the temperature below 10° C., 136 g of MgCl$_2$2.5C$_2$H$_5$-OH are added in small doses. On completion of the addition, the whole is heated at 70° C. for 4 hours, then the solid is filtered, washed repeatedly with n-heptane and dried under a vacuum of 0.2–0.5 Torr.

The surface area of the thus obtained $MgCl_2$ is 618 m$^2$/g and the pore volume 0.532 cc/g.

The following examples are given to illustrate the invention in more detail and are not intended to be limiting.

EXAMPLE 1

The solid catalytic component used in this example was obtained by grinding for 24 hours in a vibrating mill having 1 liter capacity and containing 2.5 kg of inox steel balls of 16 mm diameter, 60 g of a mixture of $TiCl_4$ and anhydrous $MgCl_2$, in such quantities as to have a titanium content of 2% by weight. 70 mg of the ground product were introduced with 1,000 ml of anhydrous n-heptane, 8 mMoles of $Al(C_2H_5)_3$ and 2.4 mMoles of 2,2,6,6-tetramethyl piperidine (TMP) in a nitrogen atmoshere were introduced into a stainless steel autoclave having a 2 liter capacity and equipped with an anchor stirrer, and heated at 85° C. 4 hydrogen and 9 ethylene atm were added and the total pressure was kept constant for the duration of the polymerization by continuously feeding ethylene. After a 3 hour reaction, the polymerization was interrupted and the polymer was filtered and dried.

The polymer yield and the properties of same are recorded in Table I.

COMPARISON EXAMPLE 1

Example 1 was repeated by using 32 g of solid catalytic component but omitting the use of TMP. The results of the polymerization test and the polymer properties are recorded in Table 1.

EXAMPLE 2

Example 1 was repeated by using 30 mg of solid catalytic component and 2.4 mMoles of tetramethyldiaminomethane instead of TMP. The results of the polymerization test and the polymer properties are recorded in Table I.

EXAMPLE 3

Example 1 was repeated by using 59 mg of solid catalytic component and 8 mMoles of Al-triisobutyl instead of Al-triethyl.

The results of the polymerization test and the polymer properties are recorded in Table I.

COMPARISON EXAMPLE 2

Example 3 was repeated by using 53 mg of solid catalytic component but leaving out the use of TMP.

The results of the polymerization test and the polymer properties are recorded in Table I.

EXAMPLE 4

Example 1 was repeated by using 27 mg of a solid catalytic component prepared by reacting an adduct $MgCl_2.2.5C_2H_5OH$ with $TiCl_4$ in such proportions that the $TiCl_4/C_2H_5OH$ molar ratio was equal to 10. The reaction was carried out at 100° C. for 2 hours.

The solid was then filtered at 100° C. and suspended again in 110 ml of $TiCl_4$ heated at 120° C. and kept at that temperature for 2 hours. The excess $TiCl_4$ was then removed by filtration and the solid was washed with n-heptane at decreasing temperatures, from 90° C. on, until chlorine ions disappeared.

The results of the polymerization test and the polymer properties are recorded in Table I.

EXAMPLE 5

Example 1 was repeated by using 26 mg of solid catalytic component prepared starting from $MgCl_2.2AlC_2H_5Cl_2$, according to Example 37 of U.S. Pat. No. 4,089,808.

The results of the polymerization test and the polymer properties are recorded in Table I.

EXAMPLE 6

Example 4 was repeated by using 33 mg of solid catalytic component and 8 mMoles of TMP.

The results of the polymerization test and the polymer properties are recorded in Table I.

EXAMPLE 7

290 mg of solid catalytic component obtained by cogrinding, under the conditions of Example 1, $TiCl_4$ and anhydrous $MgCl_2$ in such amounts as to have a titanium content of 2% by weight in the coground product, 20 ml of n-heptane, 3.6 mMoles of $AlEt_3$ and 1 mMole of TMP were introduced into a 100 cc flask provided with a stirrer.

The mixture was let react for 2 hours. The solid, after having been washed by decantation, was kept in a heptane suspension.

2 ml of the suspension (equivalent to 60 mg of solid catalytic component) and 8 mMoles of $AlEt_3$ were used in the polymerization of ethylene according to the modalities recorded in Example 1.

The polymer yield and the properties of same are recorded in Table I.

EXAMPLE 8

Example 1 was repeated by employing 33 mg of solid catalytic component prepared by reacting $MgCl_2.H_2O$ with $TiCl_4$ according to Example 1 of U.S. Pat. No. 3,953,414.

The results of the polymerization test and the polymer properties are recorded in Table I.

EXAMPLE 9

Example 1 was repeated by employing 22 mg of solid catalytic component consisting of $MgTiCl_6.2CH_3COOC_2H_5$ prepared according to Example 9 of U.S. Pat. No. 4,124,532.

The results of the polymerization test and the polymer properties are recorded in Table I.

COMPARISON EXAMPLE 3

Example 4 was repeated by employing 28 mg of solid catalytic component, but omitting the use of TMP.

The results of the polymerization test and the polymer properties are recorded in Table I.

COMPARISON EXAMPLE 4

Example 5 was repeated by employing 25 mg of solid catalytic component, but omitting the use of TMP.

The results of the polymerization test and the polymer properties are recorded in Table I.

COMPARISON EXAMPLE 5

Example 9 was repeated by employing 20 mg of solid catalytic component but omitting the use of TMP.

The results of the polymerization test and the polymer properties are recorded in Table I.

COMPARISON EXAMPLE 6

Example 8 was repeated by employing 27 mg of solid catalytic component but leaving out the use of TMP.

The results of the polymerization test and the polymer properties are recorded in Table I.

COMPARISON EXAMPLE 7

Example 1 was repeated by using 70 mg of solid catalytic component and an equimolar quantity of diphenylamine instead of TMP. Diphenylamine is an electron-donor which under the hereinabove-mentioned standard conditions is not reactive with either Al-triethyl or with $MgCl_2$.

The results of the polymerization test and the polymer properties are recorded in Table I.

COMPARISON EXAMPLE 8

Example 1 was repeated by employing 29 mg of solid catalytic component and an equimolar quantity of isoquinoline instead of TMP. Isoquinoline is an electron-donor which, under the hereinabove-mentioned standard conditions, is reactive both with Al-triethyl and with $MgCl_2$.

The results of the polymerization test and the polymer properties are recorded in Table I.

EXAMPLE 10

Comparison Example 1 was repeated by employing an equimolar amount of diethyl-aluminum 2,2,6,6-tetramethylpiperidide instead of Al-triethyl.

The results of the polymerization test and the polymer properties are recorded in Table I.

EXAMPLE 11

Comparison Example 1 was repeated but using 30 mg of a catalytic component prepared by cogrinding for 90 hours 22 g of $MgCl_2$, 6.45 ml of 2,2,6,6-tetramethylpiperidine and 4.2 ml of $TiCl_4$ in the mill described in Example 1.

The results of the polymerization test and the polymer properties are recorded in Table I.

EXAMPLE 12

600 ml of anhydrous n-hexane, 8 mMoles of $Al(C_2H_5)_3$, 2.4 mMoles of TMP and 60 g of butene-1 were introduced at 25° C. in a nitrogen atmosphere, into a stainless steel autoclave having a 2 l capacity, provided with an anchor stirrer. The temperature was brought to 65° C., 2.5 atmospheres of hydrogen and ethylene were introduced until a total pressure of 18 atm was reached. After 3 hours, 25 mg of the solid catalytic component employed in Example 1, suspended in 15 ml of n-hexane, were introduced through a steel gun and with an argon overpressure. After a period of time of 15 minutes, during which time ethylene was continuously fed, by keeping the pressure at 18 atm., the polymerization test was interruped and the obtained polymer was filtered and dried.

The results of the polymerization test and the other polymer properties are recorded in Table II.

EXAMPLE 13

Example 12 was repeated by employing 40 g of butene-1. The results of the polymerization test and the polymer properties are recorded in Table II.

EXAMPLE 14

Example 12 was repeated by using 22 mg of the solid catalytic component prepared according to Example 1 of U.S. Pat. No. 4,218,339.

The results of the polymerization test and the polymer properties are recorded in Table II.

COMPARISON EXAMPLE 8-A

Example 12 was repeated but leaving out the use of TMP. The results of the polymerization test and the polymer properties are recorded in Table II.

COMPARISON EXAMPLE 9

Example 13 was repeated but omitting the use of TMP. The results of the polymerization test and the polymer properties are recorded in Table II.

COMPARISON EXAMPLE 10

Example 14 was repeated but omitting the use of TMP. The results of the polymerization test and the polymer properties are recorded in Table II.

TABLE I

| Example No. | Polymers (g) | YIELD (gPE/g Cat) | MIE (g/10') | MIN (g/10') | MIF (g/10') | MIN/MIE | MIF/MIE |
| --- | --- | --- | --- | --- | --- | --- | --- |
| 1 | 480 | 6857 | 1.7 | 13.9 | 45.4 | 8.1 | 26.7 |
| 2 | 170 | 5666 | 0.39 | 2.3 | 8.48 | 5.9 | 21.5 |
| 3 | 290 | 4915 | 0.93 | 6.5 | 20.5 | 6.98 | 22.04 |
| 4 | 310 | 11481 | 0.71 | 4.54 | 13.88 | 6.39 | 19.71 |
| 5 | 270 | 10384 | 0.53 | 4.15 | 13.01 | 7.8 | 24.6 |
| 6 | 330 | 10000 | 0.61 | 4.35 | 14.02 | 7.13 | 22.98 |
| 7 | 410 | 6830 | 0.92 | 6.7 | 21.6 | 7.2 | 23.5 |
| 8 | 320 | 9690 | 0.18 | 1.42 | 4.96 | 7.9 | 27.6 |
| 9 | 305 | 13860 | 3.7 | 22.5 | 79.2 | 6.1 | 21.4 |
| 10 | 273 | 3900 | 0.37 | 3.02 | 9.5 | 8.1 | 25.6 |
| 11 | 207 | 6900 | 3.9 | 28.4 | 105. | 7.3 | 26.9 |
| 1 comparison | 310 | 9687 | 0.87 | 8.9 | 37. | 10.2 | 42.5 |
| 2 comparison | 290 | 5470 | 0.29 | 2.9 | 12.1 | 10.0 | 41.7 |
| 3 comparison | 410 | 14642 | 0.37 | 4.14 | 15.07 | 11.1 | 40.2 |
| 4 comparison | 390 | 15600 | 3.69 | 31.26 | 110.52 | 8.47 | 31.6 |
| 5 comparison | 390 | 19500 | 8.71 | 80.1 | 32.1 | 9.2 | 36.8 |
| 6 comparison | 440 | 16290 | 0.33 | 3.53 | 13.23 | 10.7 | 40.1 |
| 7 comparison | 350 | 5000 | 0.74 | 7.2 | 29.9 | 9.73 | 40.4 |
| 8 comparison | 120 | 4130 | 0.91 | 9.6 | 35.5 | 10.5 | 39.0 |

TABLE II

| Example No. | MIE (g/10') | MIF (g/10') | MIF/MIE | DENSITY (g/cc) | BUTENE-1 (% wt) | Crystallinity (% Rx) |
|---|---|---|---|---|---|---|
| 12 | 0.2 | 5.8 | 29. | 0.925 | 2.8 | 41 |
| 13 | 0.38 | 9.2 | 24.2 | 0.927 | 2.3 | 42 |
| 14 | 0.46 | 9.8 | 21.3 | 0.916 | 6.7 | 40 |
| 8-A comparison | 0.2 | 8.9 | 44.5 | 0.925 | 3.8 | 46 |
| 9 comparison | 0.39 | 12.5 | 32. | 0.927 | 3.0 | 44 |
| 10 comparison | 0.48 | 15.8 | 33. | 0.916 | 8.0 | 42 |

We claim:

1. Catalysts for the polymerization of ethylene and of mixtures thereof with other olefins, comprising the product of reaction between the following components:
   (a) an Al-alkyl compound;
   (b) an electron-donor compound containing at least a nitrogen atom and reactive towards $MgCl_2$, but not towards Al-triethyl under standard reaction conditions, compound (b) being used in a molar ratio with respect to compound (a), of 0.1 to 10;
   (c) the reaction product between at least a titanium compound containing at least a Ti-halogen bond and an anhydrous magnesium dihalide.

2. Catalysts according to claim 1 wherein nitrogeneous compound (b) is selected from the group consisting of 2,2,6,6-tetramethylpiperidine, N-methyl-2,2,6,6-tetramethylpiperdine, tetramethyldiaminomethane, tetramethylethylendiamine 2,2-dimethyldihydroquinoline and 2,2,6,6-tetramethylpiperidide-Al-diethyl.

3. Catalysts according to claim 2, wherein component (c) comprises a titanium compound supported on an anhydrous magnesium dihalide the crystallites of which have an average size below 150 Å.

4. Catalysts according to claim 1, wherein component (c) is prepared by cogrinding mixtures of the titanium halide with magnesium dihalide in such proportions that the titanium content in the mixture is comprised between 0.1 and 10% by weight.

5. Catalysts according to claim 1, wherein component (c) is prepared by reacting $TiCl_4$ with adducts of the magnesium dihalide with electron-donors.

6. Catalysts according to claim 5, wherein component (c) is prepared by reacting $TiCl_4$ with adducts of the magnesium dihalide of formula $MgCl_2 \cdot nROH$ where $1 \leq n \leq 6$ and R is an alkyl radical having from 2 to 8 carbon atoms.

7. Catalysts according to claim 1, wherein component (c) consists of an emulsion or a dispersion in an inert liquid medium or in the inert gas phase of a liquid phase comprising a titanium compound immiscible in an aliphatic hydrocarbon or it consists of the solid obtainable from the emulsion or dispersion.

8. Catalysts according to claim 1, wherein component (c) is prepared by reacting $TiCl_4$ with an emulsion or a dispersion in an inert liquid medium or in the inert gas phase of a liquid phase, obtained by reacting an anhydrous magnesium dihalide with an anhydrous aluminum halide, in an aromatic hydrocarbon, in the presence of a halogenated hydrocarbon.

9. Catalysts according to claim 8, wherein component (c) is prepared by reacting $TiCl_4$ with an emulsion or a dispersion in an aliphatic or cycloaliphatic hydrocarbon, obtained by reacting anhydrous $MgCl_2$ with anhydrous $AlCl_3$ in an aromatic hydrocarbon in the presence of a halogenated hydrocarbon.

10. Catalysts according to claim 1, wherein 2,2,6,6-tetramethylpiperidine-Al-dialkyl or the reaction mixture between Al-trialkyl and 2,2,2,6-tetramethylpiperidine containing said piperidide is used as component (b).

11. Catalysts according to claim 1, wherein the alpha-olefin copolymerized with ethylene is selected from the group consisting of propylene, butene-1,4-methylpentane-1 and octene-1, and in which catalysts the Al/Ti ratio is comprised between 1 and 1,000.

12. Catalysts according to claim 1, in which compound (a) is an Al-trialkyl.

13. Catalysts according to claim 1, in which compound (c) is the solid comprising the titanium compound supported on an anhydrous magnesium dihalide the crystallites of which have an average size below 300 Å.

* * * * *